United States Patent [19]
Mizuta et al.

[11] Patent Number: 5,737,335
[45] Date of Patent: Apr. 7, 1998

[54] COMMUNICATION SYSTEM USING TIME DIVISION MULTIPLEX SIGNAL TRANSMISSION

[75] Inventors: Ken Mizuta; Yukio Miura; Ken Shibazaki; Toshihiko Kawata, all of Miyagi-ken, Japan

[73] Assignee: Alps Electric Co., Ltd., Japan

[21] Appl. No.: 555,540

[22] Filed: Nov. 9, 1995

[30] Foreign Application Priority Data

Nov. 9, 1994 [JP] Japan .................... 6-275055
Jan. 10, 1995 [JP] Japan .................... 7-001952

[51] Int. Cl.$^6$ .................................................. H04J 3/16
[52] U.S. Cl. ..................... 370/444; 370/458; 340/825.51
[58] Field of Search ........................... 370/16, 53, 58.1,
370/58.3, 67, 85.1, 85.6, 85.7, 95.1, 95.2,
110.1, 431, 442, 444, 445, 447, 458, 461,
468, 498; 307/10.1; 340/825.2, 325.51

[56] References Cited

U.S. PATENT DOCUMENTS

| | | | |
|---|---|---|---|
| 4,679,192 | 7/1987 | Vanbrabant | 370/85.1 |
| 4,809,266 | 2/1989 | Okada | 370/85.1 |
| 4,907,222 | 3/1990 | Slavik | 340/53 |
| 4,930,121 | 5/1990 | Shiobara | 370/85.6 |
| 4,942,571 | 7/1990 | Moller et al. | 370/85.1 |
| 5,081,586 | 1/1992 | Barthel et al. | 364/424.059 |
| 5,343,472 | 8/1994 | Michihira et al. | 370/445 |
| 5,375,120 | 12/1994 | Hirano et al. | 370/85.1 |

FOREIGN PATENT DOCUMENTS

| | | |
|---|---|---|
| 0137609-A2 | 4/1985 | European Pat. Off. |
| 0194673-A2 | 9/1986 | European Pat. Off. |
| 0194674-A2 | 9/1986 | European Pat. Off. |
| 2177873 | 1/1987 | United Kingdom. |
| WO 87/03129 | 5/1987 | WIPO. |

*Primary Examiner*—Hassan Kizou
*Attorney, Agent, or Firm*—Guy W. Shoup

[57] ABSTRACT

A multiplex communication system in which operational data is transmitted to a bus line at different frequencies according to the necessity of transmission. Further, transmitting and receiving nodes are identified without having to include address data with the transmitted message data, thereby avoiding a time lag in control processing of vehicle-mounted equipment. In accordance with a first embodiment, a plurality of data signals which are transmitted via a bus line from a plurality of node devices, to at least one of a plurality of end node devices to be controlled, are divided into a plurality of degrees according to the necessity of transmission. Operational date signals falling into the greatest degree of transmission necessity are transmitted once in every cycle, while data signals falling into the lesser degrees of transmission necessity are transmitted once in every few cycles according to the degree of necessity. In a second embodiment, one of a plurality of node devices connected to a bus line serves as a master node device and sets the transmission cycle of message data transmitted onto the bus line. This cycle is set so as not to cause a time lag in data processing executed by the respective node devices. Each time interval between the start pulses is divided into a plurality of time slots. The time slots have been allocated to the individual node devices so that message data can be transmitted from the respective devices in the associated time slots.

11 Claims, 5 Drawing Sheets

COMMUNICATION SYSTEM USING TIME DIVISION MULTIPLEX SIGNAL TRANSMISSION

BACKGROUND OF THE INVENTION

1. Field of the Invention

The present invention relates to a multiplex communication system and, more particularly, to a multiplex communication system which is constructed to transmit operational data from a plurality of control units to at least one of a plurality of end devices to be controlled at different transmission frequencies in accordance with a degree of urgency of the operation data.

The invention further relates to a multiplex communication system and, more particularly, to a multiplex communication system which is adequate to efficiently transmit and receive data formed of a plurality of bits among a plurality of transmitting and receiving devices, and which is thus suitable for collecting information indicating states of vehicle-mounted equipment and for controlling the driving of the equipment.

2. Description of the Related Art

Generally, a typical communication system mounted in a vehicle is widely employed to transmit and receive data that is used for collecting information representing states of vehicle-mounted equipment, for controlling the driving of the equipment and for other purposes. The communication system of this type comprises a single bus line, a plurality of control units, i.e., node stations, connected to the bus line, and actuators attached to the respective node stations. Message data transmitted and received among the respective node stations includes data for controlling the actuators and address data indicating the sender and the receiver of the message, and is transmitted cyclically onto the bus line.

Along with the substantial increase in the number of electrical equipment mounted in a vehicle, the amount of signal data passing through a bus line forming a communication system is also increasing. Message data in the system according to the technique discussed above is cyclically transmitted. For example, every time a transmission cycle is started, all the items of operational data, i.e., data 1, data 2, data 3, data 4 and data 5 which are output from first to fifth vehicle-mounted control units, respectively, are sequentially transmitted to the bus line.

The communication system of the above type presents the following problems. A larger number of control units for transmitting the operational data results in an increase in the number of items of operational data to be transmitted during one transmission cycle. Accordingly, the time interval between the transmission of the same item of data (for example, data 1) becomes longer, which delays the timing of transmitting the latest operational data (for example, data 1).

Additionally, each message data contains address data, which disadvantageously increases the amount of data transmitted to the bus line, thereby causing a greater time lag in the data processing of the entire communication system.

Accordingly, various problems may be caused due to such a delay in data processing in the above-described vehicle-mounted communication system. In particular, a delay in the data processing relative to the actuators, for example, a diagnostic system for the engine, such as a throttle sensor, which is required to be operated very quickly in response to data, is very critical. In other words, among the vehicle-mounted control units, some devices generate operational signals (data) which need to be transmitted urgently, such as a collision detecting section that generates air bag signals, a door lock/unlock detecting section that generates door lock/unlock signals, etc., while other units produce operational signals (data) which do not need to be transmitted urgently, such as a window opening/closing section that generates window opening/closing instruction signals, a mirror actuating section that produces remote control mirror driving signals. A time lag in the transmission timing of the former type of signals (data) that need to be transmitted urgently jeopardizes the safety for the driver and passengers. It is thus very important to solve this problem.

SUMMARY OF THE INVENTION

Accordingly, in order to solve the problems inherent in the technique discussed above, a first object of the present invention is to provide a multiplex communication system in which operational data can be transmitted at different frequencies according to the degree of necessity of transmitting the data to a bus line.

A second object of the present invention is to provide a multiplex communication system in which the transmitting and receiving node devices can be identified without having to append address data to the transmitting message data, and a large amount of data can be transmitted without interfering with each other, thereby avoiding a time lag in the processing of controlling vehicle-mounted equipment or the like.

In order to achieve the above first object, according to a first aspect of the present invention, there is provided a multiplex communication system in which a plurality of items of operational data are transmitted in every transmission cycle, in a time division multiplexing manner, via a bus line from a plurality of control devices to at least one of a plurality of end devices to be controlled, the improvement comprising that the items of operational data are divided into a plurality of degrees according to the necessity of transmission, wherein the operational data falling into the greatest degree of transmission necessity is transmitted once in every transmission cycle, while the operational data falling into the lesser degree of transmission necessity is transmitted once in every few transmission cycles according to the degree of the transmission necessity.

In order to achieve the second object of the present invention, according to the second aspect of the present invention, there is provided a multiplex communication system in which a plurality of node devices are connected to a bus line so as to cyclically transmit and receive message data with each other and to execute processing of the received data, wherein the improvement comprises that one of the node devices functions as a master node device so as to determine a transmission cycle of the message data from all the node devices and to take the initiative in determining a transmission timing within the transmission cycle at which each of the node devices, including its own device, transmits the message data onto the bus line, the transmission timing being associated with each of the node devices, so that each of the devices sends the message data to be addressed to another device onto the bus line at the transmission timing determined by the master node device.

A time slot provided at the transmission timing associated with each of the node devices may be divided into a plurality of sub-time slots, and the sub-time slots may be arranged to correspond to the individual node devices to receive the message data transmitted from one of the node devices.

According to the foregoing construction of the first aspect of the present invention, a plurality of items of operational data to be transmitted to the bus line from a plurality of control units, respectively, are divided into a plurality of degrees which have been determined according to the transmission necessity (urgency). The operational data falling into the greatest degree of transmission necessity is positively transmitted once in every transmission cycle. On the other hand, the data falling into the lesser degrees of transmission necessity is transmitted once in every few cycles according to the degree of urgency.

With this arrangement, signals (data) having the greater necessity (urgency) of transmission, such as an air bag signal and door lock/unlock signals that are respectively output from a collision detecting section and a door lock/unlock detecting section among a plurality of vehicle-mounted control units, are positively transmitted once in every cycle. This arrangement inhibits a time lag in transmitting signals having the greater degree of transmission necessity, which further ensures safety for the driver and passengers.

Additionally, signals (data) having the lesser degree of necessity (urgency) of transmission, such as a window opening/closing instruction signal and a remote control mirror driving signal that are respectively output from a window opening/closing section and a mirror actuating section among a plurality of vehicle-mounted control units, are transmitted only once in every few cycles according to the degree of urgency. This arrangement makes it possible to reliably operate each end device to accomplish a required function based on the operational signal (data) without interfering with the transmission timing of signals having the greater degree of urgency.

Further, according to the second aspect of the present invention, the timing at which each node device transmits message data has been determined. Also, the individual sub-time slots obtained by dividing the time slot that is arranged at the above-described predetermined timing are allocated to the individual node devices to receive the message data. With this arrangement, each node device is able to transmit message data to a desired end device without having to append the sender and receiver information to the transmitting data merely by carrying the data onto the sub-time slot provided for the associated end node device within the time slot allocated to its own device.

Through use of this multiplex communication system, it is thus possible to perform faster transmission of message data without a time loss, which further shortens a transmission cycle of message data from the respective node devices. By the application of this system to vehicle-mounted equipment or the like, it is possible to prevent a time lag in the processing of controlling the equipment.

DESCRIPTION OF THE PREFERRED EMBODIMENTS

A detailed description will now be given of a first embodiment of a multiplex communication system according to the present invention.

Figure 1:
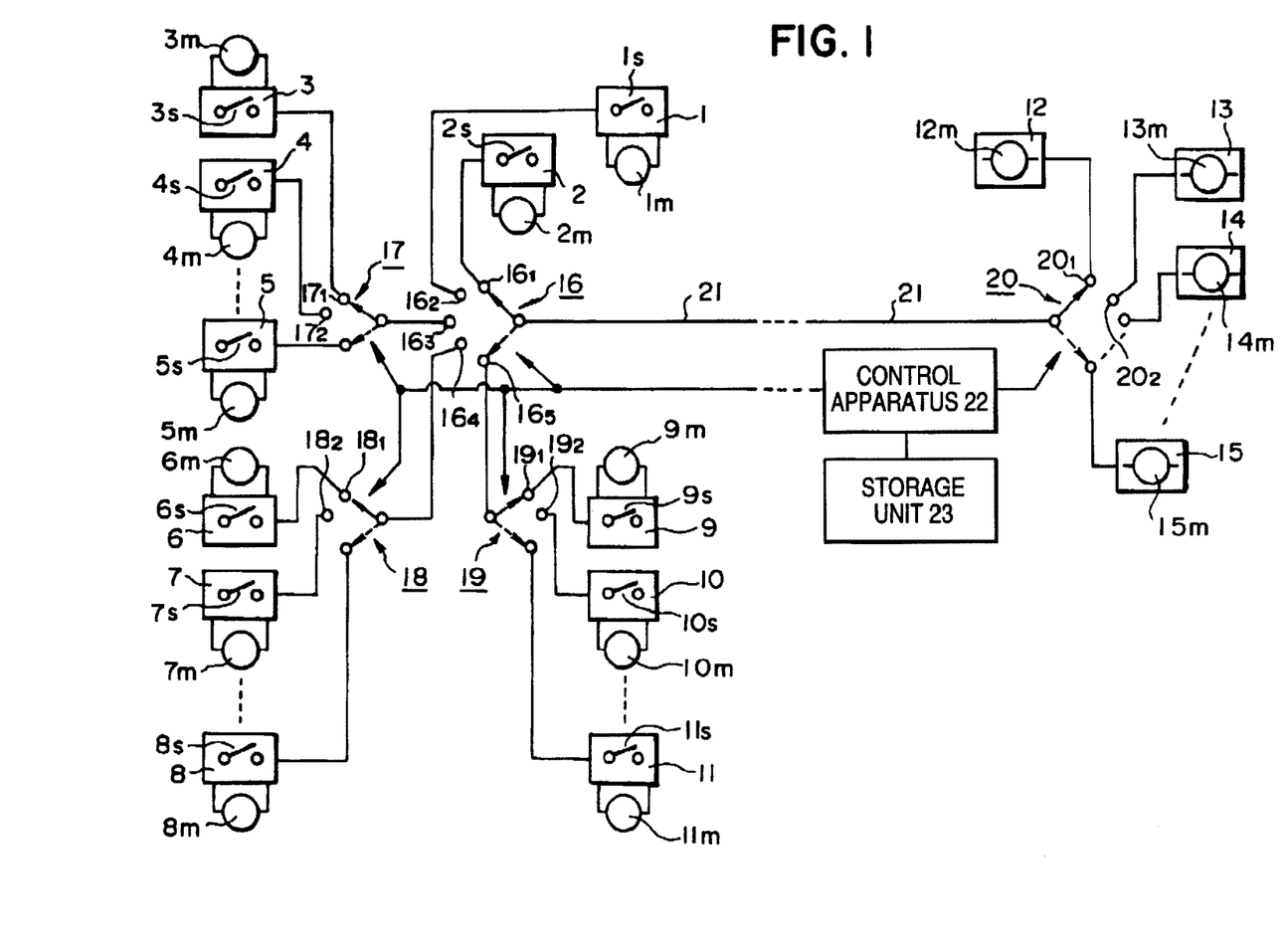
FIG. 1 is a circuit diagram illustrating the construction of a multiplex communication system according to a first embodiment of the present invention.
Figure 2:
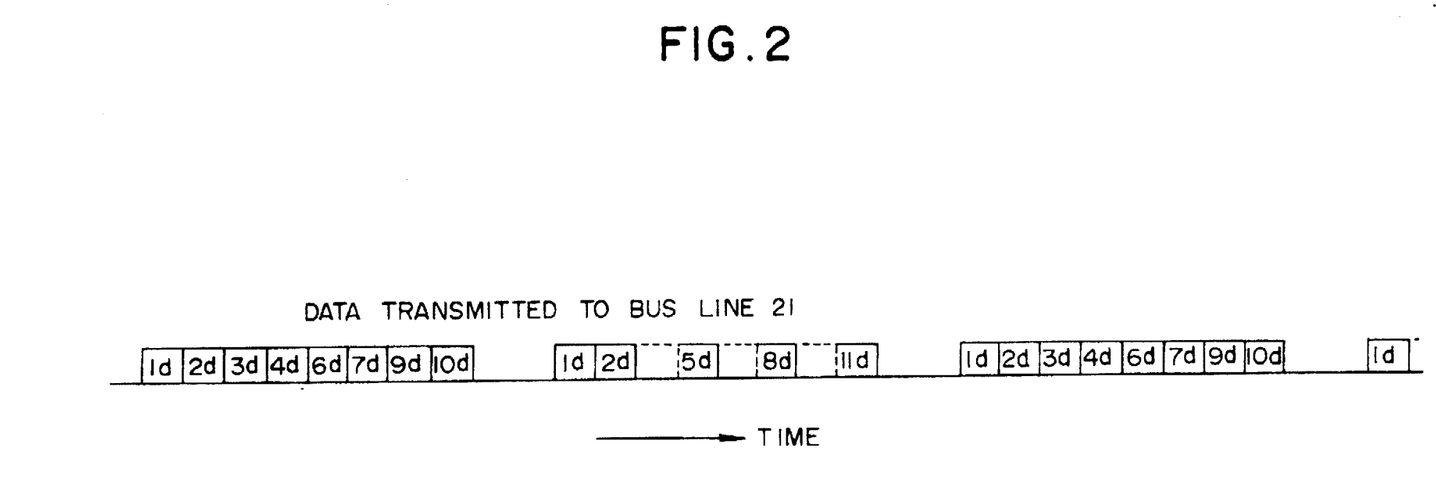
FIG. 2 illustrates the operation of the system shown in FIG. 1 in which data is transmitted via a bus line in a time division multiplexing manner.

FIG. 1 is a circuit diagram illustrating the construction of a first embodiment of a multiplex communication system according to the present invention. More specifically, FIG. 1 illustrates an example of a multiplex communication system mounted in a vehicle. FIG. 2 illustrates one example of the operation of the multiplex communication system shown in FIG. 1 in which operational data is transmitted in a time division multiplexing manner via a bus line.

Referring to FIG. 1, first to eleventh control units (node device) 1 to 11 are mounted in the common vehicle, and first to fourth end devices to be controlled 12 to 15 are also mounted in the same vehicle. The first to eleventh control units 1 to 11 respectively include at least operational switches $1s$ to $11s$, and motors $1m$ to $11m$ which are connected with the switches $1s$ to $11s$. The first to fourth end devices 12 to 15 respectively include at least motors $12m$ to $15m$. A first changeover switch 16 has a single circuit with a plurality of contacts whose plurality of fixed contacts are respectively connected to the output terminal of the first control unit 1, the output terminal of the second control unit 2, and the respective movable contacts of second and third changeover switches 17 and 18 each having a single circuit with a plurality of contacts. The movable contact of the first changeover switch 16 is connected to a bus line 21. A plurality of fixed contacts of the second changeover switch 17 are respectively connected to the output terminals of the third, fourth and fifth control units 3, 4 and 5. A plurality of fixed contacts of the third changeover switch 18 are respectively connected to the output terminals of the sixth, seventh and eighth control units 6, 7 and 8. A plurality of fixed contacts of a fourth changeover switch 19 are respectively connected to the output terminals of the ninth, tenth and eleventh control units 9, 10 and 11. A fifth changeover switch 20 also has a single circuit with a plurality of contacts whose fixed contacts are respectively connected to the input terminals of the first to fourth end devices 12 to 15. The movable contact of the fifth changeover switch 20 is connected to the bus line 21. An overall control apparatus 22, which is coupled to a storage unit 23, is connected at its output terminal to the first to fifth changeover switches 16 to 20 so that it can exert control over the switching of the contacts of the first to fifth switches 16 to 20.

The operation of the system of this embodiment constructed as described above will now be explained with reference to FIG. 2.

When the key is inserted to the vehicle, the control apparatus 22 starts the control operation. At the start of the operation, the apparatus 22 reads a program which has been stored in the storage unit 23 and permits a built-in buffer memory, or the like, to store information representing the degrees of necessity of transmitting the respective items of operational data, that is, the degrees of urgency of transmitting the data. The information read by the control apparatus 22 determines the switching states of the contacts of the first to fifth switches 16 to 20 and the timing of switching the contacts of the switches 16 to 20. Subsequently, when a first transmission cycle of a plurality of items of operational data is started, the control apparatus 22 causes the contact of the first switch 16 to be sequentially switched from one end to the other end of the fixed contacts at required switching timings. In synchronization with switching the contacts of the first switch 16, the control apparatus 22 also causes the contacts of the second to fourth changeover switches 17 to 19 to be switched according to the content of the above-described information.

An explanation will now be given with reference to FIG. 2 of one example of the switching operation of the respective contacts of the first to fourth switches 16 to 19. The movable contact of the first switch 16 is initially switched and connected to a first fixed contact $16_1$ for a given period t so that operational data $1d$ can be transmitted to the bus line 21 from the first control unit 1. Then, the movable contact of the first switch 16 is switched and connected to the second fixed contact $16_2$ for a given period t so that operational data $2d$ can be transmitted to the bus line 21 from the second control unit 2.

Thereafter, the movable contact of the first switch 16 is switched and connected to the third fixed contact $16_3$ for a given period $2t$, which is twice as long as the above-described period t. This is because of the following reason. During the switching and connecting operation of the movable contact of the first switch 16 to the fixed contact $16_3$, the movable contact of the second switch 17 is sequentially switched and connected to the first and second fixed contacts $17_1$ and $17_2$, each for the given period t. Simultaneously with this switching and connecting operation, two items of operational data $3d$ and $4d$ are sequentially transmitted to the bus line 21 from the third and fourth control units 3 and 4, respectively.

Then, the movable contact of the first switch 16 is switched and connected to the fourth fixed contact $16_4$, during which time the movable contact of the third switch 18 is sequentially switched and connected to the first and second fixed contacts $18_1$ and $18_2$, each for the given period t, in a manner similar to the connection of the movable contact of the first switch 16 to the third fixed contact $16_3$. Because of this switching and connecting operation, two items of operational data $6d$ and $7d$ are sequentially transmitted to the bus line 21 from the control units 6 and 7, respectively. Finally, the movable contact of the first switch 16 is changed and connected to the fifth fixed contact $16_5$, during which time the movable contact of the fourth switch 19 is sequentially changed and connected to the first and second fixed contacts $19_1$ and $19_2$, each for a given period t. Because of this switching and connecting operation, two items of operational data $9d$ and $10d$ are transmitted to the bus line 21 from the control units 9 and 10, respectively.

As a consequence of these switching and connecting operations, the operational data $1d$ to $4d$, $6d$ and $7d$, and $9d$ and $10d$ are transmitted in the time division multiplexing manner to the bus line 21 from the first to the fourth, the sixth and seventh, and the ninth and tenth control units, respectively (the combination of these items of operational data shall be referred to as a first combination of operational data).

In this first transmission cycle, if the operation switches $1s$ to $4s$, $6s$ and $7s$, and $9s$ and $10s$ of the first to the fourth, the sixth and the seventh, and the ninth and the tenth control units 1 to 4, 6 and 7, and 9 and 10, respectively, are not actuated at all in the transmission timings allocated to the above-described control units, the respective items of operational data $1d$ to $4d$, $6d$ and $7d$, and $9d$ and $10d$ transmitted from the control units indicate zero, i.e., the data items do not contain any information. On the other hand, if any of the switches $1s$ to $4s$, $6s$ and $7s$, and $9s$ and $10s$ is actuated, the operational data among the data items of $1d$ to $4d$, $6d$ and $7d$, and $9d$ and $10d$ transmitted from the associated control unit(s) whose switch(es) are actuated indicates that the data item contains information.

Upon completion of the first transmission cycle, after a lapse of a given transmission interval, a subsequent (second) transmission cycle is started to once again transmit a plurality of items of operational data in a time division multiplexing manner. In the second transmission cycle, the respective items of operational data $1d$ and $2d$ are positively transmitted to the bus line 21 from the first and second control units 1 and 2, respectively, by the switching and connecting operation of the contacts of the first to fourth switches 16 to 19 under the control of the control apparatus 22. In contrast, the items of operational data $3d$, $4d$, $6d$, $7d$, $9d$ and $10d$ from the third, fourth, sixth, seventh, ninth and tenth control units, 3, 4, 6, 7, 9 and 10, respectively, are not transmitted. Instead, the items of operational data $5d$, $8d$ and $11d$ from the fifth, eighth and eleventh control units 5, 8 and 11, respectively, which have not been transmitted during the first transmission cycle, are transmitted to the bus line 21. As a consequence, during the second transmission cycle, the items of operational data $1d$, $2d$, $5d$, $8d$ and $11d$ are transmitted to the bus line 21 from the first, second, fifth, eighth and eleventh control units 1, 2, 5, 8 and 11, respectively, in a time division multiplexing manner (the combination of these items of operational data shall be referred to as a second combination of operational data).

Upon completion of the second transmission cycle, after a lapse of a given transmission interval, a third transmission cycle is initiated. In the third transmission cycle, the first combination of operational data obtained during the first transmission cycle is once again transmitted in a time division multiplexing manner. In a subsequent fourth transmission cycle, the second combination of operational data obtained during the second transmission cycle is once again transmitted in a time division multiplexing manner. The same applies to after the fourth transmission cycle. Every time an updated transmission cycle is started after a lapse of a given transmission interval, the first and second combinations of operational data are alternately transmitted to the bus line 21 in a time division multiplexing manner.

Every time a transmission cycle is started, the control apparatus 22 causes the movable contact of the fifth switch 20 to be switched in a required order. Due to this switching operation, every time operational data is transmitted to the bus line 21, an associated end device to receive the transmitted data is selected by switching the movable contact of the fifth switch 20. For example, if the operational data $1d$ is addressed to the first end device 12, and the operational data $2d$ is addressed to the second end device 13, the movable contact of the fifth switch 20 should be switched to the first fixed contact $20_1$ connected to the end device 12 and to the second fixed contact $20_2$ connected to the second end device 13 in accordance with the transmission timing of the data $1d$ and $2d$ to the bus line 21. The same applies to the other items of operational data. Namely, in accordance with the transmission timing of the data to the bus line 21, the movable contact of the fifth switch 20 should be changed so that an associated end device(s) to receive the transmitted data can be selected. The motor provided with the associated end device then suitably acts upon the content of the data so that a required operation can be performed in the end device supplied with the transmitted data.

In this embodiment, the operational data having a greater degree of urgency corresponds to air bag signals that are output from a collision detecting section, door lock/unlock signals that are output from a door lock/unlock detecting section, and so on. On the other hand, the data having a lesser degree of urgency corresponds to window opening/closing instruction signals that are output from a window opening/closing section, remote control mirror driving signals that are output from a mirror actuating section, and so on.

In this embodiment, each of the movable contacts of the second to fourth switches 17 to 19 is sequentially switched and connected to the associated two fixed contacts while the first switch 16 is switched and connected to each of the third to fifth fixed contacts $16_3$ to $16_5$. However, each of the movable contacts of the second to fourth switches 17 to 19 may be switched and connected to only one of the fixed contacts while the first switch 16 is switched and connected to each of the third to fifth fixed contacts $16_3$ to $16_5$. Alternatively, each of the movable contacts of these switches may be switched and connected to three fixed contacts or more.

Further, this embodiment has been explained in which the two items of operational data 1d and 2d are positively transmitted from the first and second control units 1 and 2, respectively, in every transmission cycle, while the operational data items 3d, 4d, 6d, 7d, 9d and 10d from the control units 3, 4, 6, 7, 9 and 10, respectively, and the data items 5d, 8d and 11d from the control units 5, 8 and 11, respectively, are alternately transmitted in every other cycle. However, this arrangement is not essential. That is, the data that is positively transmitted in every transmission cycle is not restricted to 1d and 2d, and instead, the data from the other control units may be selected as long as it is required to be transmitted very urgently. Also, the number of items of data to be transmitted is not limited to two, and instead, three or more items of data may be selected.

Moreover, in the above-described embodiment, the respective items of operational data 1d to 11d are divided into two degrees depending on the transmitting urgency, i.e., one degree formed of the data items 1d and 2d that are positively transmitted once in every transmission cycle, and the other degree formed of the other data items 3d to 11d that are alternately transmitted in every other cycle. However, the degrees of necessity (urgency) of transmitting the data are not limited to two, but may be three or more as required. A plurality of degrees of transmitting urgency may be accomplished by the following modification. A plurality of changeover switches each having a single circuit with a plurality of contacts are used and suitably switched to a plurality of control units. At the same time, the switching periods of the change-over switches, each having a single circuit with a plurality of contacts, are selected by the control apparatus 22. With this modification, the following three types of operational data can be generated: the data transmitted in every transmission cycle; the data transmitted in every other cycle; and the data transmitted in every two or three cycles.

As will be clearly understood from the foregoing description, the first embodiment offers the following advantages.

A plurality of items of operational data 1d to 11d transmitted to the bus line 21 from a plurality of control units 1 to 11, respectively, are divided into a plurality of degrees which have been determined according to the necessity of transmission. The operational data falling into the greater degree of transmission necessity is positively transmitted once in every transmission cycle. On the other hand, the data falling into the lesser degree of transmission necessity is transmitted once in every few cycles according to the degree of necessity. As described above, signals having the greater necessity (urgency) of transmission, such as air bag signals and door lock/unlock signals that are respectively output from the collision detecting section and the door lock/unlock detecting section among the vehicle-mounted control units 1 to 11, are positively transmitted once in every cycle. This arrangement inhibits a time lag in transmitting signals having the greater degree of necessity (urgency), which further ensures safety for the driver and passengers.

Additionally, as described above, signals (data) having the lesser degree of transmitting necessity (urgency), such as window opening/closing instruction signals and remote control mirror driving signals that are respectively output from the window opening/closing section and the mirror actuating section among the control units 1 to 11, are transmitted only once in every few cycles according to the degree of urgency. This arrangement makes it possible to reliably operate a desired end device to accomplish a required function based on the operational signal (data) without interfering with the transmission timing of signals having the greater degree of urgency.

The multiplex communication system mounted in a vehicle has been discussed in this embodiment by way of example. However, this system is not only applicable to a vehicle, but also to other uses as long as the system is adequate to generate a plurality of items of data that can be distinctly differentiated into the degrees of transmission urgency and also to transmit them in a time division multiplexing manner.

A second embodiment of a multiplex communication system according to the present invention will now be explained in detail with reference to FIGS. 3 to 5.

Figure 3:
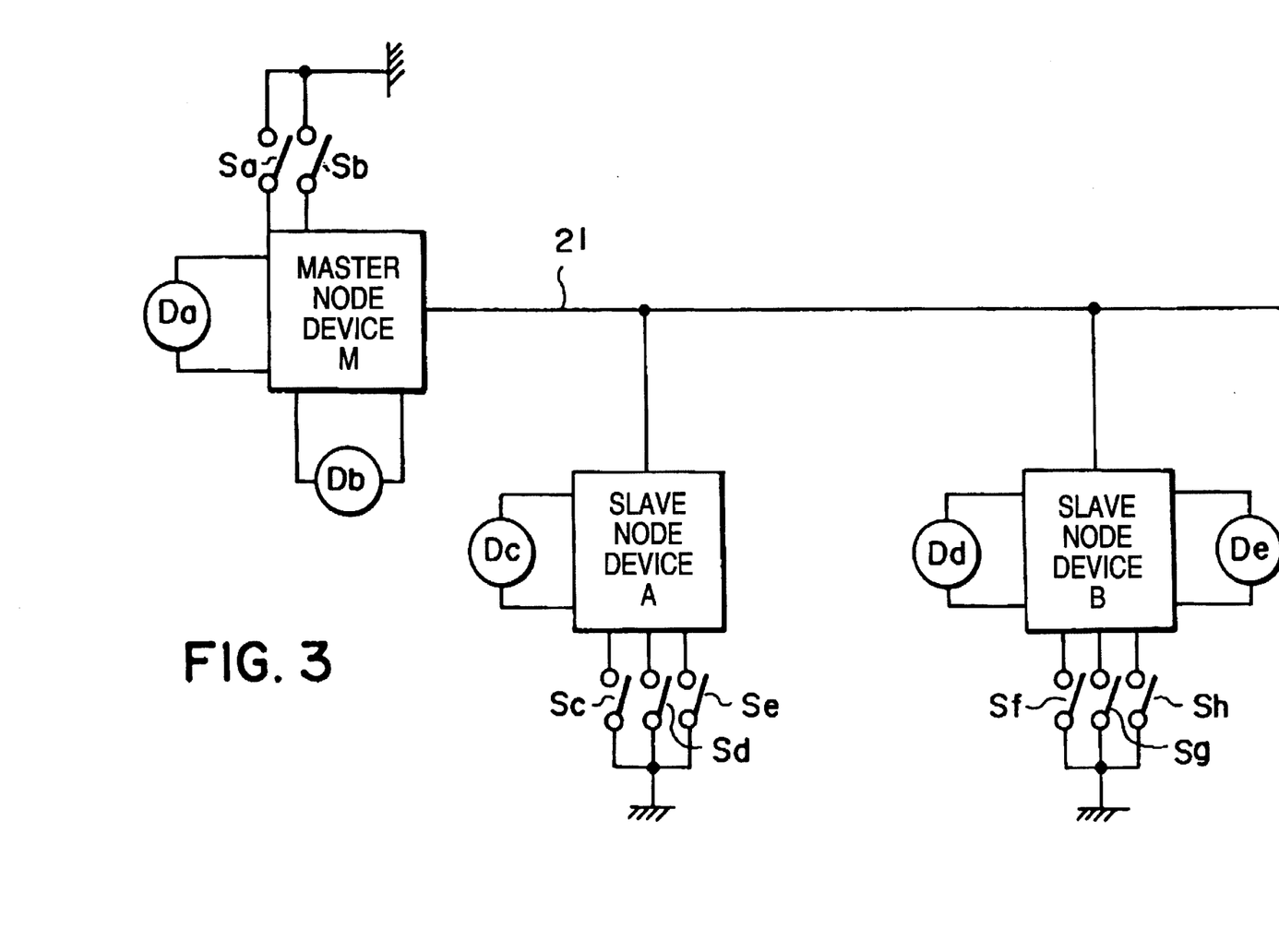
FIG. 3 is a block diagram illustrating an example of the construction of a multiplex communication system according to a second embodiment of the present invention.

FIG. 3 is a block diagram illustrating the construction of a multiplex communication system according to the second embodiment. FIG. 4 illustrates the construction of message data transmitted to a bus line. FIG. 5 is a flow chart illustrating the operation of this embodiment. FIG. 3 shows a bus line 21, a master node device M, slave node devices A and B, actuators Da to De, and switches Sa to Sh.

More specifically, the multiplex communication system of the second embodiment comprises the single common bus line 21, the master node device M connected to the bus line 21 so as to determine the transmission timings of all the items of message data in the communication system, and a plurality of slave node devices A and B connected to the bus line 21. It will now be assumed that this system is installed in a vehicle for controlling vehicle-mounted equipment and for other reasons. The master node device M is connected to peripheral equipment, for example, mounted on the driver's seat, such as switches Sa and Sb indicating the states of the door and the window and the state of the window opening/closing switch, etc., and actuators Da and Db, such as a door lock motor, a power window motor, etc. With this construction, the master node device M collects data indicating the state of the switches Sa and Sb and transmits it to the bus line 21 as required so as to exert control over the actuators Da and Db. On the other hand, the slave node devices A and B are connected to peripheral equipment, for example, mounted on the passenger's front seat and on the rear seats so that they can collect and transmit data so as to exert control over the respective actuators, in a manner similar to the master node device M.

Each of the master node device M and the slave node devices A and B is provided with a CPU. The master node device M takes the initiative in determining the transmission timing and cycle of the message data onto the bus line 21. More specifically, the node device M exerts control over the transmission timing and cycle by use of a clock timer of the CPU contained in its own device so that the message data can be transmitted to the bus line 21 from each of the master node device M and the slave node devices A and B at a predetermined timing and cycle. The master node device M transmits and receives message data with the slave node devices A and B in accordance with the above-described predetermined timing and cycle so that it can exert control over required actuators.

Figure 4:
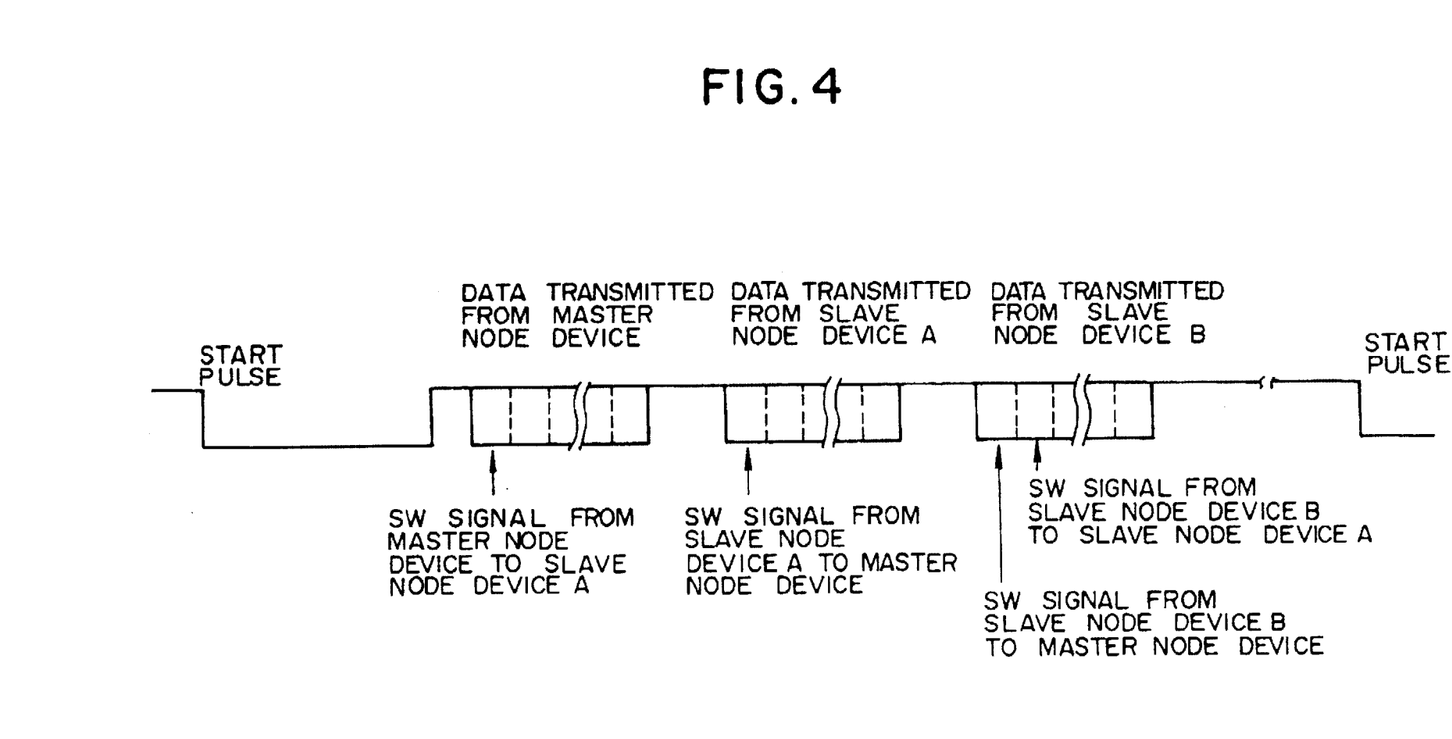
FIG. 4 illustrates the construction of message data transmitted to the bus line in the system shown in FIG. 3.
Figure 5:
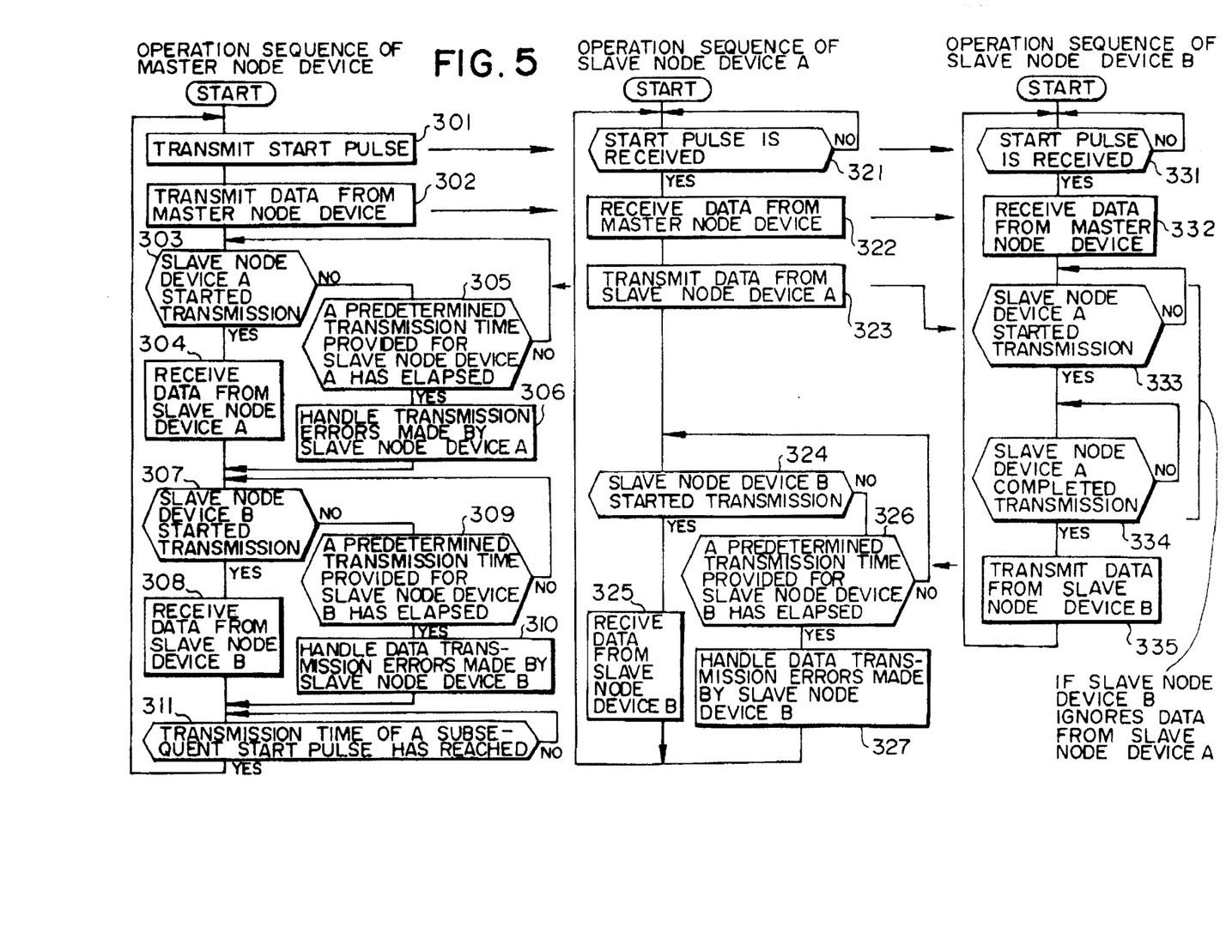
FIG. 5 is a flow chart illustrating the operation of the second embodiment.

The transmission timing and cycle of the message data transmitted to the bus line 21 are determined as indicated in FIG. 4. This will be explained in greater detail below.

As shown in FIG. 4, the transmission cycle of the message data has been set as a start pulse transmitted to the bus line 21 from the master node device M. This cycle has been set so as not to cause a time lag in the data processing executed in the respective node devices. Each of the time intervals between start pulses is divided into a plurality of time slots which have been allocated to the individual node devices, during which slot the node devices transmit and receive message data with each other.

In the example shown in FIG. 4, in a first time slot subsequent to the start pulse, the master node device M transmits message data to the other node devices. In a second time slot, the slave node device A transmits message data to the other node devices. In a third time slot, the slave node device B transmits message data to the other node devices. Similarly, subsequent time slots are arranged for executing data transmission among different node devices. For identifying the respective time slots, time intervals, which are different from the pulse length of the start pulse, each intervene between the time slots.

Each time slot used for transmitting message data from each node device to the other node devices is divided into a plurality of sub-time slots which can carry data formed of one bit or a plurality of bits. Each time slot has been allotted to a predetermined node device for transmitting message data, as described above, and the sub-time slots have also been allocated to the end node devices to receive such data. For example, the leading sub-time slot within the time slot allocated to the data transmission of the slave node device A is used to transmit message data from the slave node device A to the master node device M. A subsequent sub-time slot is used to transmit message data from the slave node device A to the slave node device B.

As has been discussed above, in the second embodiment the timing and cycle for transmitting message data to the bus line 21 have been determined. Additionally, during the individual sub-time slots within each time slot that can carry message data, it has been determined which node device can transmit data to which end device. With this arrangement, each node device connected to the bus line 21 can be notified which message data is to be addressed to its own device merely by monitoring the time slots on the bus line 21 after acknowledging the receipt of a start pulse from the master node device M. Each node device can also be notified which time slot can be used to transmit message data from its own device.

This arrangement enables each of the node devices, including the master node device M, to receive message data from the other node devices as required, and to control the actuator, etc. connected to its own device. Each node device is also able to transmit to a desired node device the state of switches indicating the status of the various types of equipment connected to its own device.

The operation of the second embodiment of the present invention will now be described with reference to the flow chart of FIG. 5. In this embodiment, the multiplex communication system constructed of the master node device M and the slave node devices A and B, all of which are connected to the bus line 21, will be taken as an example.

(1) The master node device M first transmits a start pulse to the bus line 21 (step 301).

(2) Subsequent to the transmission of the start pulse, the time slot allocated to the data transmission of the master node device M is started. The node device M thus transmits message data that is addressed to a desired slave node device by use of the associated sub-time slot (step 302).

(3) Upon completion of the transmission by use of the time slot allocated to the master node device M, a subsequent time slot allocated to the data transmission of the slave node device A is initiated. The master node device M thus monitors the start of transmitting message data from the slave node device A (step 303), and also monitors a lapse of a predetermined time provided for transmission from the node device A (step 305).

(4) If there is any message data addressed to the master node device M from the slave node device A, the node device M receives it by use of the sub-time slot allocated to its own device (step 304).

(5) If the transmission of the message data from the slave node device A is not started after a lapse of the above-described transmission predetermined time (step 305), the master node device M executes transmission error handling in respect of the slave node device A (step 306).

(6) Upon completion of data transmission by use of the previous time slot, a subsequent time slot allocated to data transmission of the slave node device B is started. The master node device M monitors the start of the transmission of message data from the slave node device B (step 307), and also monitors a lapse of a predetermined transmission time provided for the node device B (step 309).

(7) If there is any message data addressed to the master node device M from the slave node device B, the node device M receives the data by use of the sub-time slot allotted to its own device (step 308).

(8) If the transmission of the message data from the slave node device B is not started after a lapse of the above-described predetermined time, the master node device M executes transmission error handling in respect of the slave node device B (step 310).

(9) The master node device M goes into a standby position until the transmission time of a subsequent start pulse is reached (step 311), and returns to step 301 to transmit the subsequent start pulse (step 311).

The operation of the system has been discussed in terms of the sequence of the master node device M. An explanation will now be given of the operation of the slave node device A in relation to the master node device M.

(10) The slave node device A monitors the bus line 21 in the standby position until a start pulse is transmitted from the master node device M (step 321).

(11) Upon acknowledgement of the receipt of the start pulse, the time slot allocated to the data transmission of the master node M is started. The slave node device A thus receives the message data from the master node device M in the sub-time slot allocated to its own device (step 322).

(12) Upon completion of the previous slot, a subsequent time slot allocated to the data transmission of the slave node device A is initiated. The node device A thus transmits message data that is to be addressed to the master node device M and the other slave node device by use of the respective associated sub-time slots (step 323).

(13) A subsequent time slot allocated to the data transmission of the slave node device B is started. The node device A thus monitors the start of transmitting message data from the node device B (step 324), and also monitors a lapse of a predetermined transmission time provided for the node device B (step 326).

(14) If there is any message data addressed to the slave node device A from the node device B, the node device A receives the data in the sub-time slot allotted to its own device (step 325).

(15) If the transmission of the message data from the slave node device B is not started after a lapse of the above-described predetermined transmission time, the node device A executes transmission error handling in respect of the node device B (step 327).

(16) Upon completion of the processing of either of steps 325 or 327, the slave node device A returns to step 321 to continue to receive data in a subsequent cycle.

The slave node device B is operated in a manner similar to the node device A. An explanation will thus be given only of the operation in which the node device B ignores the message data transmitted from the node device A.

(17) The slave node device B monitors the bus line 21 and is stationed at the standby position until it receives a start pulse from the master node device M (step 331).

(18) Upon acknowledgement of the receipt of the start pulse, the time slot allocated to the data transmission of the master node device M is started. The slave node device B thus receives the message data contained in the sub-time slot allotted to its own device (step 332).

(19) Upon completion of the previous slot, a subsequent time slot allocated to the data transmission of the slave node device A is started. During this time slot, the node device B can ignore the unnecessary data from the node device A (step 333), and can be stationed in the standby position until the transmission of the message data from the slave node device A is completed (step 334).

(20) Upon completion of the previous time slot, the time slot allocated to the data transmission of the slave node device B is started. The node device B thus transmits message data that is to be addressed to the master node device M and the other slave node device by use of the respective associated sub-time slots (step 335), and returns to step 331 to continue to receive subsequent data.

This embodiment has been explained in which the multiplex communication system is constructed of the master node device M and the slave node devices A and B, all of which are connected to the common bus line 21. However, this construction is not exclusive. The present invention is also operable when the slave node devices are connected to a plurality of bus lines.

Also, in this embodiment, the master node device M takes the initiative in determining the transmission timing of message data from each of the node devices onto the bus line. However, the master node device M may be constructed as desired. Also, if the master node device M fails during operation, a desired slave node device may be constructed to act as the master node device. This modification can be achieved by programming into each node device, conditions, such as the states of the other node devices required when its own device functions as the master node device.

As will be clearly understood from the foregoing description, the present invention offers the following advantages.

A plurality of items of operational data to be transmitted to the bus line from a plurality of control units, respectively, are divided into a plurality of degrees which have been determined according to the transmission necessity. The operational data falling into the greatest degree of transmission necessity is positively transmitted once in every transmission cycle. On the other hand, the data falling into the lesser degree of transmission necessity is transmitted once in every few cycles according to the degree of urgency. By the application of this system to a vehicle by way of example, signals having the greater necessity (urgency) of transmission, such as air bag signals and door lock/unlock signals that are respectively output from the collision detecting section and the door lock/unlock detecting section among a plurality of vehicle-mounted control units, are positively transmitted once in every cycle. This arrangement inhibits a time lag in transmitting signals having the greater degree of transmission urgency, which further ensures safety for the driver and passengers.

Additionally, by the application of the multiplex communication system to a vehicle by way of example, signals (data) having the lesser degree of transmitting necessity (urgency), such as window opening/closing instruction signals and remote control mirror driving signals that are respectively output from the window opening/closing section and the mirror actuating section among a plurality of vehicle-mounted control units, are transmitted only once in every few cycles according to the degree of urgency. This arrangement makes it possible to reliably operate each end device to accomplish a required function based on the operational signal (data) without interfering with the transmission timing of signals having the greater degree of urgency.

Further, each node device is able to transmit message data to a desired end device without appending the sender and receiver information to the data merely by carrying the data onto the sub-time slot corresponding to the end node device within the time slot allocated to its own device. This makes it possible to perform faster transmission of message data without a time loss, which further shortens a transmission cycle of message data from the respective node devices, thereby preventing a time lag in the control processing of vehicle-mounted equipment.

What is claimed is:

1. A multiplex communication system in which a plurality of data signals are transmitted during a plurality of transmission cycles via a bus line from a plurality of node devices to at least one of a plurality of end devices, each transmission cycle being divided into a plurality of equal-length time slots, the multiplex communication system comprising:

means for controlling transmission of the data signals according to a necessity of transmission, wherein a first data signal having a greatest degree of transmission necessity is transmitted in a first time slot during each of the plurality of transmission cycles, while second and third data signals having a lesser degree of transmission necessity are transmitted in a second time slot in a predetermined alternating sequence such that each of the second and third data signals is always transmitted every n transmission cycles, where n is an integer greater than or equal to two;

wherein connections between said plurality of node devices and said bus line, and connections between said plurality of end devices and said bus line are selectively switched by a plurality of change-over switches which are controlled by a control apparatus.

2. A multiplex communication system according to claim 1, wherein said plurality of node devices are mounted in a vehicle, and said plurality of end devices are mounted in the vehicle and controlled by the operation of said plurality of node devices.

3. A multiplex communication system in which a plurality of data signals are transmitted during a plurality of transmission cycles via a bus line from a plurality of node devices to at least one of a plurality of end devices, each transmission cycle being divided into a plurality of equal-length time slots, the multiplex communication system comprising:

means for controlling transmission of the data signals according to a necessity of transmission, wherein a first data signal having a greatest degree of transmission necessity is transmitted in a first time slot during each of the plurality of transmission cycles, while second and third data signals having a lesser degree of transmission necessity are transmitted in a second time slot in a predetermined alternating sequence such that each of the second and third data signals is always transmitted every n transmission cycles, where n is an integer greater than or equal to two;

wherein said plurality of node devices are mounted in a vehicle, and said plurality of end devices are mounted in the vehicle and controlled by the operation of said plurality of node devices.

4. A multiplex communication system according to claim 3, wherein said data signals are divided into degrees of transmission necessity based on an urgency of transmitting said data signals.

5. A multiplex communication system comprising:

a plurality of node devices connected to a bus for transmitting a plurality of data signals during a plurality of transmission cycles via the bus line to at least one of a plurality of end devices, each transmission cycle being divided into a plurality of time slots, each time slot having a fixed length, and means for controlling transmission of the data signals according to a necessity of transmission, wherein a first data signal having a greatest degree of transmission necessity is transmitted in a first time slot during each of the plurality of transmission cycles, while second and third data signals having a lesser degree of transmission necessity are transmitted in a second time slot in a predetermined alternating sequence such that each of the second and third data signals is always transmitted every n transmission cycles, where n is an integer greater than or equal to two;

wherein said data signals are divided into degrees of transmission necessity based on an urgency of transmitting said data signals.

6. A multiplex communication system comprising a plurality of node devices connected to a bus line such that each node device cyclically transmits and receives message data signals on said bus line and executes processing of the received data, wherein one of said node devices functions as a master node device so as to determine a transmission cycle of the message data signals from all the node devices and to determine a transmission timing within said transmission cycle at which each of said node devices, including the master node device, transmits message data signals onto said bus line, said transmission timing being associated with each of said node devices, so that each of said devices sends the message data signals addressed to another device onto said bus line at said transmission timing determined by said master node device, and wherein a time slot provided at said transmission timing associated with each of said node devices is divided into a plurality of sub-time slots, and said sub-time slots are arranged to correspond to the individual node devices to receive the message data transmitted from one of said node devices.

7. A multiplex communication system according to claim 6, wherein each of said node devices, including said master node device, include a CPU, wherein the CPU of said master node device determines said transmission cycle and said transmission timing associated with each of said node devices arranged within said cycle, while the CPU of each of said node devices, including said master node device, controls the transmission timing so that the message data signals is transmitted from said node device at the time slot determined by the CPU of said master node device.

8. A multiplex communication system according to claim 6, wherein a second one of said node devices performs the functions of said master node device if said master node device fails to operate.

9. A multiplex communication system according to claim 6, wherein a second one of said node devices performs the functions of said master node device if said master node device fails to operate, and wherein each of said node devices, including said master node device, include a CPU, wherein the CPU of said master node device determines said transmission cycle and said transmission timing associated with each of said node devices arranged within said cycle, while the CPU of each of said node devices, including said master node device, controls the transmission timing so that the message data signals are transmitted from said node device at the time slot determined by the CPU of said master node device.

10. A multiplex communication system in which a plurality of data signals are transmitted during a plurality of transmission cycles via a bus line from a plurality of node devices to at least one of a plurality of end devices, each transmission cycle being divided into a plurality of time slots, the multiplex communication system comprising:

means for controlling transmission of the data signals according to a necessity of transmission, wherein a first data signal transmitted from a first node device and having a greatest degree of transmission necessity is transmitted in a first time slot during each of the plurality of transmission cycles, while second and third data signals respectively transmitted from second and third node devices and having a lesser degree of transmission necessity are alternately transmitted in a second time slot during every two or more transmission cycles;

wherein said means for controlling transmission of said data signals includes a control apparatus for generating control signals according to a program stored in a storage unit; and wherein a connection between said first node device and said bus line occurs through a first change-over switch, and connections between said second and third node devices and said bus line occur through said first change-over switch and a second change-over switch, and said first and second change-over switches are controlled by said control signals generated by said control apparatus.

11. A multiplex communication system comprising:

a bus;

a first node device connected to the bus for generating a higher-priority data signal;

a second node device connected to the bus for generating a first lower-priority data signal;

a third node device connected to the bus for generating a second lower-priority data signal; and means for controlling the first, second and third nodes in accordance with a fixed transmission sequence such that during a first transmission cycle, the higher-priority data signal and the first lower-priority data signal are always transmitted in a predetermined order on the bus as a first combination of data signals, during a second transmission cycle, the higher-priority data signal and the second lower-priority data signal are always transmitted in the predetermined order on the bus as a second combination of data signals, and during subsequent transmission cycles, the first combination of data signals and the second combination of data signals are retransmitted on the bus, thereby transmitting the higher-priority data signal at least twice as often as each of the first and second lower-priority data signals.

* * * * *

UNITED STATES PATENT AND TRADEMARK OFFICE
CERTIFICATE OF CORRECTION

PATENT NO.   : 5,737,335
DATED        : April 7, 1998
INVENTOR(S)  : Ken Mizuta et al.

It is certified that error appears in the above-indentified patent and that said Letters Patent is hereby corrected as shown below:

<u>In the Title Page</u>

In column 2, line 12, under "ABSTRACT" replace "date" with --data--.

Signed and Sealed this

Fifth Day of January, 1999

Attest:

Attesting Officer

*Acting Commissioner of Patents and Trademarks*